United States Patent [19]
Bergmann

[11] 3,894,208
[45] July 8, 1975

[54] METHOD OF ABRASIVE MACHINING OF MATERIAL BY MEANS OF AN ENERGY BEAM

[76] Inventor: Wilfried Hellmuth Bergmann, Heimatring 44/II, 6000 Frankfurt am Main, Germany

[22] Filed: Sept. 27, 1973

[21] Appl. No.: 401,541

Related U.S. Application Data

[63] Continuation-in-part of Ser. No. 223,288, Feb. 3, 1972, abandoned.

[30] Foreign Application Priority Data
Feb. 12, 1971 Germany.............................. 2106823

[52] U.S. Cl............................... 219/121 EM; 83/15
[51] Int. Cl.............................................. B23k 15/00
[58] Field of Search... 219/121 EB, 121 EM, 121 L, 219/121 LM; 225/93.5; 331/94.5 A; 83/15, 170; 65/112

[56] References Cited
UNITED STATES PATENTS

| | | |
|---|---|---|
| 1,710,211 | 4/1949 | Grammeter........................ 83/15 X |
| 1,752,567 | 4/1930 | McCullough ....................... 83/15 X |
| 3,091,114 | 5/1963 | Villalobos............................... 83/15 |
| 3,215,345 | 11/1965 | Ferguson ........................... 225/93.5 |
| 3,236,133 | 2/1966 | DePas.................................... 83/170 |
| 3,453,097 | 7/1969 | Häfner.................................... 65/112 |
| 3,474,219 | 10/1969 | Steigerwald................... 219/121 EB |

*Primary Examiner*—J. V. Truhe
*Assistant Examiner*—G. R. Peterson
*Attorney, Agent, or Firm*—McGlew and Tuttle

[57] ABSTRACT

A method of machining a solid material which has a vapor pressure curve which defines a phase boundary between the solid and the gaseous state at a temperature and pressure below the "Triple" point comprises, subjecting the solid to an energy beam at a temperature and pressure below the Triple point to cause the solid to become immediately transformed into a gaseous state, that is, to become sublimated.

7 Claims, 3 Drawing Figures

METHOD OF ABRASIVE MACHINING OF MATERIAL BY MEANS OF AN ENERGY BEAM

CROSS-REFERENCE TO PRIOR APPLICATION

This application is a continuation-in-part of copending application Ser. No. 223,288, filed Feb. 3, 1972, now abandoned.

FIELD AND BACKGROUND OF THE INVENTION

This invention relates to a method for engraving or abrasive machining of materials by means of an energy beam.

DESCRIPTION OF THE PRIOR ART

The utilization of radiation as an energy source for thermal machining or engraving of materials or work pieces is known. In this process, energetic radiation, for instance, accelerated electrons, ions or photons, is absorbed and/or reflected by the material to be machined to create a heat source in the work spot. The power distribution in the impinging beam can be chosen by appropriate control circuitry to guarantee the desired thermal process, for instance, heating, melting or evaporation.

In detail, the specific result in abrasive machining or engraving of a workpiece by a focussed energy beam directed toward the work spot may be achieved essentially by transforming the volume to be removed from the initial solid (1) into the melted state (2) and finally evaporating it (3) at least partially, see FIG. 1. An additional removal of material may be achieved by increasing the temperature in the work spot further to create a relatively high vapor pressure which may result in an explosion-like ejection of the adjacent merely melted material.

In practice, the effectively evaporated portion of the material is rather small in comparison to the melted portion so that a relatively large portion of the material remains from the resolidified melt after discontinuation of the energy input. This resolidified material limits the applicability of this method in many cases.

Increasing the temperature by increasing the power distribution in the working spot does not increase essentially the fraction of the evaporated material since now one has to use the expensive radiation energy for performing the mechanical task of removing the melted material. In addition, the space charge effect limits the achievable power density in charged particle beams.

U.S. Pat. No. 3,453,097 (Hafner) discloses one prior art method which cuts glass by heating it along the desired line with a laser beam. The wave length is selected so that the laser light is absorbed by the glass and therefore is heating the glass localized along the desired line. Subsequently it is cooling the glass along the same line, and this enhances thermal stress cracking. Any melted portions of the glass along the path of the laser is blown away by a gas or fluid stream which follows closely the laser beam; it also fuses two pieces of glass together along such a line.

U.S. Pat. No. 3,474,219 (Steigerwald et al.) teaches another method of the prior art which utilizes as a tool for melting small regions of materials a "beam of radiant energy." Such beams can comprise "corpuscular rays" (for instance electrons, protons or ions) or "electromagnetic rays" (for instance photons or laser beams). Thus, this method and and the invention herein, in principle only, use the same tool for localized heating of the same materials. But since there is reference to heating very small regions of these materials under different conditions of vacuums (pressure) and temperature, different results are obtained. This prior art method only evacuates the apparatus to a degree which prevents the electron beam from becoming dispersed or scattered by the intervening air between the beam source and the work piece. With a laser beam there is no need to work in a vacuum at all. This method of U.S. 3,474,219 accomplishes only localized liquefaction as it works at too high a pressure. This melting may be accompanied by some (but not all) evaporation. The major portions of the melted material will remain at the work spot in this process and has therefore to be removed by additional means. But even by all of these means of U.S. Pat. No. 3,474,219 this method can not remove all of the liquefied material, since the liquefied material adheres at least in a very thin film to the not melted material very strongly because of the very strong cohesive forces. Thus, by the application of this method there will remain always in the wake of the passing beam a resolidified surface film or welding seam. The other method involves cutting glass by thermal stress induction with a laser, and blowing away melted portions of the glass along the path of the laser and also fusing two pieces of glass together along such a path.

In the process of the present invention I introduce the radiant energy (energy beam) into a very small surface region — a much smaller one than in the prior art methods — at a sufficient low pressure and a sufficient low temperature below the triple point of this material in such a controlled fashion that this very small irradiated region of the material sublimates immediately (evaporates without any liquefaction) upon heating up. Thus in my process there remains a minute engraved "ditch or trough" in the wake of the passing beam without any resolidified surface film or welding seam.

It can be concluded that the prior art methods of abrasive machining or engraving by means of an energy beam are connected with a rather high power consumption and do not lead to satisfactory results in many applications because of the usual working conditions which include the phase transformations from the solid (1) via the liquid (2) into the gas phase (3) (See FIG. 1 of the drawings).

SUMMARY OF THE INVENTION

The present invention therefore deals with a method for abrasive machining or engraving by means of an energy beam which in comparison to the presently practiced methods achieves a superior efficiency as well as superior technical results.

According to the invention this is accomplished by cooling the material or the area to be machined at appropriate low pressure to a temperature possibly in the vicinity of absolute zero and machining thereafter with an energy beam in such a fashion that the irradiated material immediately transforms into the gas state, i.e. sublimates. Refrigerating equipment is commercially available, for example, from Air Products and Chemicals, Inc., 733 West Broad Street, Emmaus, Penna. 18049, such as model AC-3L, a Cryo-Tip Refrigerator which cools to 3.6°K. Different Vacuum Shrouds for this equipment are also offered by Air Products and Chemicals, Inc.

Accordingly, it is an object of the invention to provide a method of machining a solid material which has a vapor pressure curve which defines a phase boundary between the solid and the gaseous state below the Triple point comprising subjecting the solid to an energy beam at a temperature and pressure below the Triple point in order to cause the solid to become immediately transformed into the gaseous state.

A further object of the invention is to provide a method which is simple in concept and execution and economical to carry out.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated and described a preferred embodiment of the invention.

DESCRIPTION OF SPECIFIC EMBODIMENT

Figure 1:
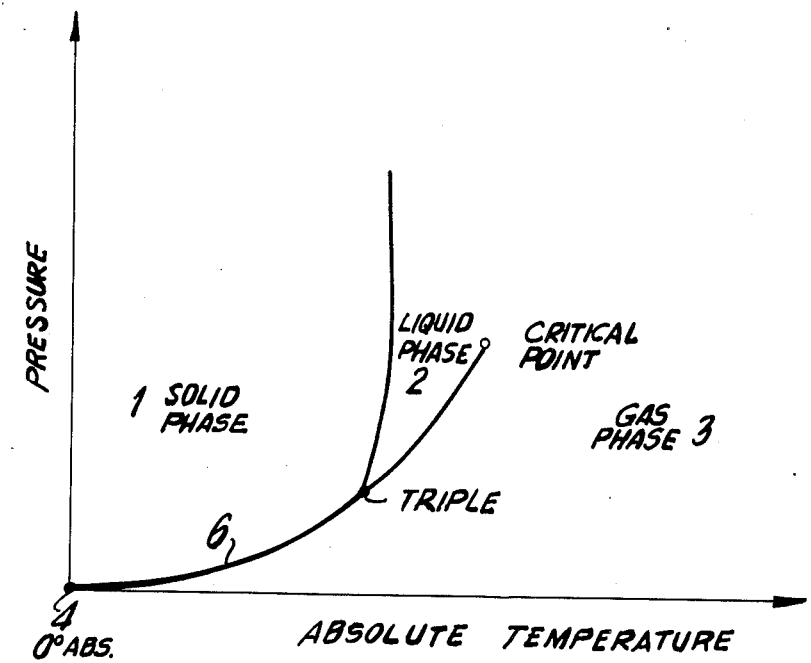
FIG. 1 is a curve varying in accordance with pressure and temperature of the substance showing the phase boundaries.

The machining process according to this invention is based upon the knowledge that with the exception of Helium all solids have — between absolute zero (4) and the triple point (5) — a vapor pressure curve (6) which sets up a phase boundary between the solid (1) and the gas state (3) (see FIG. 1). The invented method succeeds in utilizing the sublimation of solids for engraving or abrasive machining.

An improvement of the invented method consists of lowering the working temperature of the work piece below 4.2°K. The specific heat of most solids decreases by at least 3 powers of 10 resulting in the essential advantage that for removing a defined volume an appropriately smaller fraction of energy is necessary. The thermal stabilization of the machined material or work piece can be accomplished by the use of superfluid Helium.

Especially advantageous for this invented process is the use of an electron or ion beam.

The production of an electron or ion beam, its shaping as well as the specific thermal machining process necessitate an appropriate vacuum. Therefore the invented method of abrasive machining or engraving has to be conducted in the same fashion as the known electron and ion beam methods in an evacuated working chamber. This results in further advantages, for instance that the transformation from Helium I into Helium II — which according to the invention is a preferred cooling agent for the work piece to be machined — may be achieved by the vacuum existing in the working chamber. Furthermore the vacuum creates a sufficient thermal insulation.

A further important advantage of the invented method is that the penetration of material into the beam source is checked because of the resulting fast resolidification of the sublimated material at the existing low pressures.

When practicing the invention with an electron or ion beam only relatively low accelerating voltages for the beam are necessary.

As was mentioned above a relatively low beam intensity is needed for creating the desired effects because of the previously mentioned reduction in energy. Since a low intensity charged particle beam may be focussed better than a high intensity beam the further advantage is that focus diameters of $1/10\mu$ or less can be achieved. This indicates that by the invented method materials may be removed with a resolution much better than $1/10\mu$.

For a further demonstration of the invented method of machining by the above method the following example may serve. In the following Table 1 the important thermal properties for engraving — for instance a tantalum film of $0.1-1\mu$ thickness evaporated on a silicon wafer — are compared with those at temperatures of superfluid Helium. In this example the process consists of the total sublimation of a narrow strip (about $1\mu$ wide) of tantalum by appropriate interaction of an energy beam, without the essential interacting of the latter with the silicon substrate underneath. Already this comparison of only a few parameters demonstrates the energetic advantage of heating at low temperatures, quite aside from the fact that only at those low temperatures and the associated low pressures the phase change by means of sublimation can be ascertained.

TABLE 1

|  | λ |  |  | c |  |  | ρ |  | a |  |
|---|---|---|---|---|---|---|---|---|---|---|
|  | 300°K | 2°K | 1°K | 300°K | 2°K | 1°K | 300°K | 300°K | 2°K | 1°K |
| Ta | 0,6 | 0,075 | 0,04 | $1,4.10^{-1}$ | $6,8.10^{-5}$ | $3,2.10^{-5}$ | 16,6 | $2,58.10^{-1}$ | $6,65.10^1$ | $7,53.10^1$ |
| Si | 1,48 | 0,7 | 0,18 | $7,03.10^{-1}$ | $2,1.10^{-6}$ | $2,63.10^{-7}$ | 2,33 | $9,03.10^{-1}$ | $1,43.10^5$ | $2,94.10^5$ |

Notation:
λ heat conductivity in W/cm.°K
c specific heat in J/g.°K
ρ density in g/cm³
a thermal diffusivity in cm²/sec.

Figure 2:
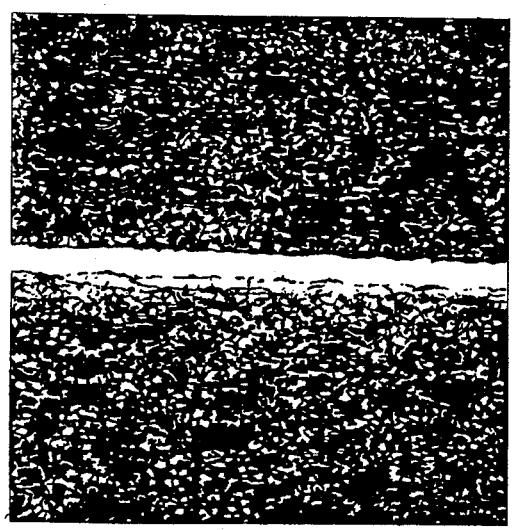
FIG. 2 is a photograph of an engraving made according to the present invention.

In the accompanying FIG. 2 a view is shown through a microscope perpendicularly upon a 6 $\mu$ thick $Nb_3Sn$ film which was vapor deposited on a 45 $\mu$ thick Hastelloy-B ribbon. In its middle by the method of the invention there was engraved an about 20 $\mu$ wide "ditch or trough" 6 $\mu$ deep dividing the superconducting $Nb_3Sn$ layer into two fields. At the bottom of the ditch or trough the surface of the Hastelloy-B ribbon can be seen.

Figure 3:
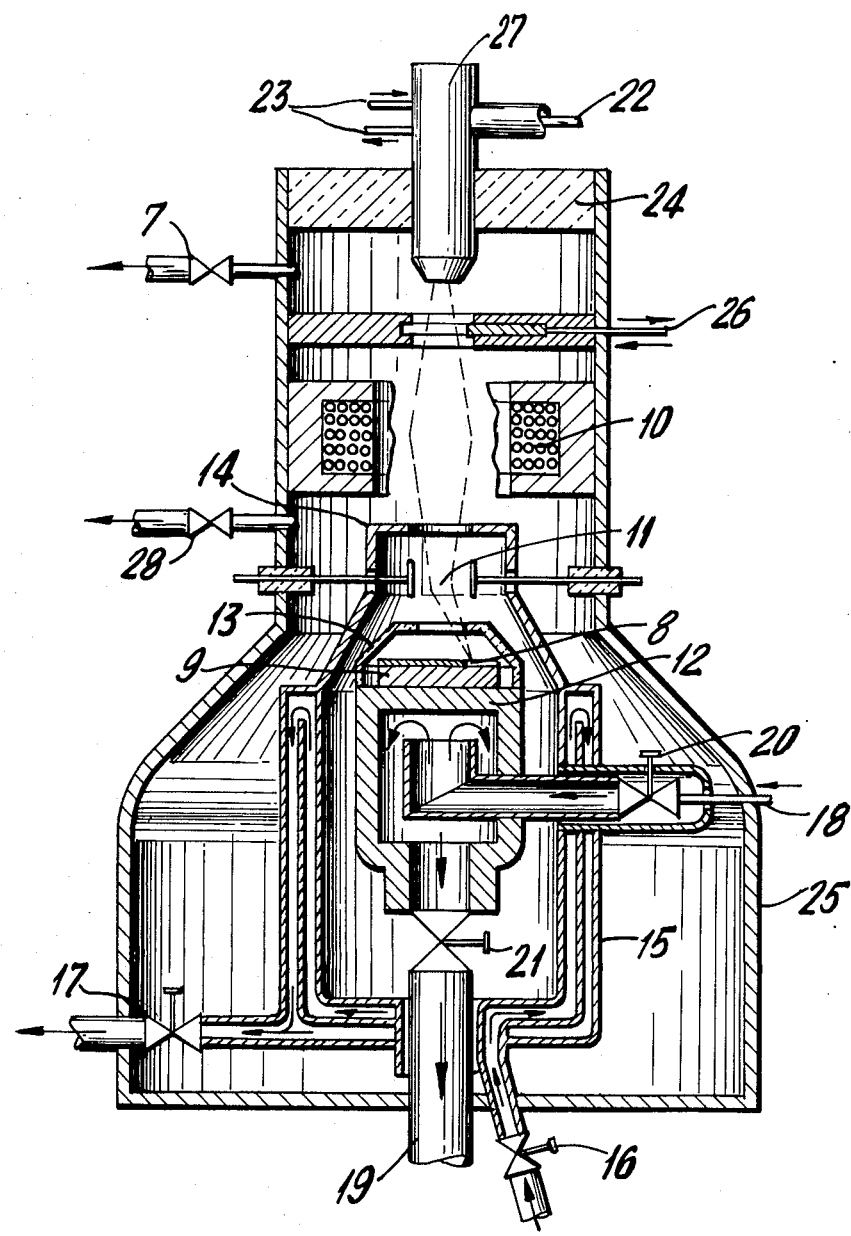
FIG. 3 is a schematic drawing illustrating the apparatus useful in performing the method of the invention.

FIG. 3 shows the apparatus used for carrying out the invention. A description of a cold-stage very similar to the one used in the present invention with an electron-beam micromachining equipment originally built by Zeiss is described by B. W. Griffiths and J. A. Venables, SEM 1972, pg. 10–16. In such an apparatus the electron beam generator is replaced with for instance a YAG-laser for carrying out engraving or milling experiments with a laser beam at temperatures in the range of 4,2°K.

FIG. 3 describes the apparatus used in the present invention. In this diagrammatical drawing 27 depicts the beam source with its power 22 and cooling connections 23. This beam source 27 can be either an electron-, ion- or a laser-beam (YAG) source. It is mounted in the main insulator 24 of the vacuum enclosure 25 of the equipment. To facilitate servicing and exchanging the source a shut off valve 26 and vacuum pump connection 7 are provided. For focussing the beam onto the workspot 8 of the sample 9 an electromagnetic lens 10 is provided (for laser operation this is replaced by an appropriate optical system). For guiding the workspot along the surface in a prescribed fashion a conventional electrostatic or electromagnetic deflection system 11 is provided (at operation with a laser this is exchanged for an appropriate electro-optical deflection system). The sample 9 is mounted on the helium-cold-stage 12 and is surrounded by appropriate thermal shields at helium temperature 13 and liquid-nitrogen temperature 14. This nitrogen shield 15 with circulating liquid nitrogen and its inlet 16 and outlet valves 17 surrounds the helium stage 12 except for the beam-port and the connections to the liquid-helium reservoir 18 and the helium pump 19. The helium-temperature in the helium-stage 12 is being controlled by the two automatic control valves 20 and 21 holding the helium in the stage at a constant (reduced) pressure.

The thermal insulation of the cold-stage is facilitated by evacuation via a pump connected to the main vacuum valve 22.

What is claimed is:

1. In the method of abrasive machining of a workpiece comprising solid material having a vapor pressure curve defining a phase boundary between the solid and gaseous state at a temperature and pressure below its Triple point, the improvement comprising cooling said solid material to a temperature and pressure below its Triple point; subjecting said solid material to an energy beam to thereby transform a portion of said solid material immediately into the gaseous state without passing through a liquid state, and removing said portion of said solid material in the gaseous state.

2. The improved method, according to claim 1, wherein the solid material is maintained at a temperature of approximately 4.2°K.

3. The improved method, according to claim 1, wherein a superfluid helium (HE II) is used for cooling the material.

4. The improved method, according to claim 1, wherein the energy beam comprises charged particles.

5. The improved method, according to claim 1, wherein the energy beam comprises a photon beam.

6. The improved method, according to claim 5, wherein the photon beam comprises a laser.

7. The improved method according to claim 1, wherein the energy beam comprises an electron or ion beam and is operated in an appropriate focused fashion and at relatively low accelerating voltages so as to transform the solid material to be removed from the workpiece directly as a gas without melting of said solid material.

* * * * *